(12) United States Patent
Tamamura et al.

(10) Patent No.: US 11,370,684 B2
(45) Date of Patent: Jun. 28, 2022

(54) METHOD AND DEVICE FOR MANUFACTURING GLASS ARTICLE

(71) Applicant: Nippon Electric Glass Co., Ltd., Shiga (JP)

(72) Inventors: Shusaku Tamamura, Shiga (JP); Shusuke Okamoto, Shiga (JP); Kazuyuki Tenyama, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 282 days.

(21) Appl. No.: 16/768,961

(22) PCT Filed: Nov. 29, 2018

(86) PCT No.: PCT/JP2018/043953
§ 371 (c)(1),
(2) Date: Jun. 2, 2020

(87) PCT Pub. No.: WO2019/124017
PCT Pub. Date: Jun. 27, 2019

(65) Prior Publication Data
US 2021/0147275 A1    May 20, 2021

(30) Foreign Application Priority Data

Dec. 20, 2017 (JP) .............................. JP2017-244144

(51) Int. Cl.
*C03B 5/027* (2006.01)
*C03B 5/235* (2006.01)
(Continued)

(52) U.S. Cl.
CPC ................ *C03B 5/235* (2013.01); *C03B 5/42* (2013.01); *C03B 17/064* (2013.01); *F27D 3/14* (2013.01)

(58) Field of Classification Search
CPC ......... C03B 5/16; C03B 5/167; C03B 5/1672; C03B 5/1675; C03B 5/173; C03B 5/187;
(Continued)

(56) References Cited

U.S. PATENT DOCUMENTS 3,244,495 A * 4/1966 Apple ..................... C03B 5/225
65/327
5,002,600 A    3/1991 Sorg et al.
(Continued)

FOREIGN PATENT DOCUMENTS

CN    103359914    10/2013
JP    2-180720    7/1990
(Continued)

OTHER PUBLICATIONS

International Search Report dated Mar. 5, 2019 in International (PCT) Application No. PCT/JP2018/043953.
(Continued)

*Primary Examiner* — Hung D Nguyen
(74) *Attorney, Agent, or Firm* — Wenderoth, Lind & Ponack, L.L.P.

(57) ABSTRACT

Provided is a manufacturing method for a glass article, including: a pre-heating step (S1) of heating a transfer pipe (7); and a transfer step (S4) of allowing a molten glass to flow inside the transfer pipe (7) after the pre-heating step (S1). The transfer pipe (7) includes: a main body portion (8) having a tubular shape; and a flange portion (9a, 9b) formed at an end portion of the main body portion (8). The main body portion (8) is retained by a refractory (10). The pre-heating step (S1) includes an external force application step of applying an external force (F) to the transfer pipe (7) to extend the transfer pipe (7).

20 Claims, 9 Drawing Sheets

(51) Int. Cl.
  *C03B 5/42* (2006.01)
  *C03B 17/06* (2006.01)
  *F27D 3/14* (2006.01)
  *C03B 5/02* (2006.01)

(58) Field of Classification Search
  CPC ......... C03B 5/1875; C03B 5/20; C03B 5/202;
       C03B 5/205; C03B 5/225; C03B 5/2252;
       C03B 5/23; C03B 5/235; C03B 5/2356;
       C03B 5/24; C03B 5/26; C03B 5/262;
       C03B 5/42; C03B 5/43; C03B 5/44;
       C03B 17/04; C03B 17/06; C03B 17/064;
       C03B 17/067; F27D 3/14; F27D 3/145
  USPC ...................................... 373/27–41
  See application file for complete search history.

(56) References Cited

U.S. PATENT DOCUMENTS

| | | | |
|---|---|---|---|
| 8,695,378 B2* | 4/2014 | Thomas | C03B 5/031 65/134.1 |
| 2003/0015000 A1* | 1/2003 | Hayes | C03B 5/202 65/157 |
| 2005/0229637 A1* | 10/2005 | Hamashima | C03B 5/2252 65/135.1 |
| 2009/0282872 A1* | 11/2009 | Tomamoto | C03B 5/1875 65/66 |
| 2011/0204039 A1* | 8/2011 | De Angelis | C03B 7/07 219/438 |
| 2012/0125051 A1* | 5/2012 | Bergman | C03B 7/02 65/324 |
| 2013/0125591 A1* | 5/2013 | Yamamoto | B01F 27/50 65/135.3 |
| 2016/0297701 A1* | 10/2016 | Hwang | C03B 5/16 |
| 2017/0291840 A1* | 10/2017 | Goller | B01F 27/90 |
| 2018/0251394 A1* | 9/2018 | Frink | C03C 1/004 |
| 2019/0322563 A1* | 10/2019 | Bookbinder | C04B 35/486 |

FOREIGN PATENT DOCUMENTS

| | | |
|---|---|---|
| JP | 2013-216535 | 10/2013 |
| JP | 2014-9125 | 1/2014 |

OTHER PUBLICATIONS

International Preliminary Report on Patentability and Written Opinion of the International Searching Authority dated Jun. 23, 2020 in International (PCT) Application No. PCT/JP2018/043953.
Office Action and Search Report dated Jan. 25, 2022 in corresponding Chinese Patent Application No. 201880070536.7, with English translation of Search Report

* cited by examiner

METHOD AND DEVICE FOR MANUFACTURING GLASS ARTICLE

TECHNICAL FIELD

The present invention relates to a method and an apparatus for manufacturing a glass article such as a sheet glass.

BACKGROUND ART

As is well known, flat panel displays such as liquid crystal displays and OLED displays have been reduced in thickness and weight. Along with such reduction in thickness and weight, further reduction in thickness of a sheet glass to be used for the flat panel displays is also required.

In general, as a method for manufacturing a sheet glass to be used for flat panel displays, various forming methods such as an overflow down-draw method are used. For example, the sheet glass is formed into a thin sheet through various steps such as a melting step, a fining step, a homogenizing step, and a forming step. In Patent Literature 1, there is disclosed a manufacturing apparatus configured to perform the steps described above, which includes a melting furnace, a fining bath, a stirring bath, a forming device, and transfer pipes (glass supply pipes) configured to connect these constituents to each other and transfer a molten glass.

The molten glass to be transferred through the transfer pipes becomes higher in temperature. Therefore, in order to enable the transfer of the molten glass, it is required that the transfer pipes be pre-heated in advance before operation of the sheet glass manufacturing apparatus (hereinafter, this step is referred to as "pre-heating step"). In the pre-heating step, when heating is performed under a state in which the transfer pipes are coupled to each other or in which the transfer pipes and other constituents such as the fining bath are coupled, the coupling portions may be deformed due to thermal expansion (hereinafter simply referred to as "expansion"), with the result that the transfer pipes may be damaged. Therefore, in Patent Literature 1, there is disclosed a method of assembling the manufacturing apparatus after performing the pre-heating step under a state in which the transfer pipes and other constituents are separated.

CITATION LIST

Patent Literature

Patent Literature 1: JP 2013-216535 A

SUMMARY OF INVENTION

Technical Problem

However, with the pre-heating step in the related art, in some cases, the expansion of the transfer pipe cannot be sufficiently secured due to differences in various conditions such as a supporting structure, a heating temperature, and a heating time for the transfer pipe. When the expansion of the transfer pipe in the pre-heating step is insufficient, thermal stress is generated in the transfer pipe. In this case, in the manufacture of the glass article after assembly of the manufacturing apparatus, the transfer pipe is further expanded. Therefore, the thermal stress in the transfer pipes is increased, and there is a risk of causing damage.

The present invention has been made in view of the circumstances described above, and has an object to provide a manufacturing method and a manufacturing apparatus for a glass article, which is capable of sufficiently expanding a transfer pipe in a pre-heating step.

Solution to Problem

The present invention has been made to solve the problem described above, and provides a manufacturing method for a glass article, comprising: a pre-heating step of heating a transfer pipe; and a transfer step of allowing a molten glass to flow inside the transfer pipe after the pre-heating step, wherein the transfer pipe comprises: a main body portion having a tubular shape; and a flange portion formed at an end portion of the main body portion, wherein the main body portion is retained by a refractory, and wherein the pre-heating step comprises an external force application step of applying an external force to the transfer pipe to extend the transfer pipe.

According to the configuration described above, through application of the external force to the transfer pipe, in the pre-heating step, expansion of the transfer pipe is promoted so that the transfer pipe can be sufficiently expanded, thereby being capable of reducing the thermal stress generated in the transfer pipe. Therefore, also in the manufacture of the glass article after the pre-heating step, the thermal stress in the transfer pipe can be reduced, and deformation or buckling of the transfer pipe caused by the expansion can be prevented, thereby being capable of achieving a long lifetime.

In the external force application step, it is preferred that the external force be applied to the transfer pipe so that a measured expansion length of the transfer pipe approaches a theoretical expansion length. When the expansion length (measured expansion length) of the transfer pipe measured at a freely selected heating time in the pre-heating step approaches the theoretical expansion length at the heating time (heating temperature), the expansion length of the transfer pipe in the pre-heating step can be optimized with high accuracy. Here, the "measured expansion length" is a measurement value of the expansion length of the transfer pipe, and the "theoretical expansion length" is an expansion length of the transfer pipe which is calculated based on a heating temperature and a coefficient of thermal expansion.

Further, it is preferred that the external force application step be performed when a difference between the theoretical expansion length and the measured expansion length is larger than a predetermined threshold value. With this, the transfer pipe can be expanded efficiently.

It is preferred that the refractory be fixed to a casing, and in the external force application step, the external force be applied to the transfer pipe by bringing a pressing member of the casing into contact with the flange portion. When the refractory is fixed to the casing, the transfer pipe and the refractory can be moved along with the movement of the casing. When the casing comprises the pressing member, the pressing member can also be moved along with the movement of the casing. Thus, the operation of connecting the transfer pipes and other constituents after the pre-heating can be performed efficiently.

Further, in the external force application step, it is preferred that the external force be applied to the flange portion at a plurality of positions in a circumferential direction of the flange portion. With this, the main body portion can be suitably expanded while preventing local deformation of the flange portion.

Further, it is preferred that the main body portion of the transfer pipe be arranged in an inclined posture, and in the external force application step, the external force be applied along an inclination direction of the main body portion. With this, the inclined main body portion can be suitably expanded.

The present invention has been made to solve the problem described above, and provides a manufacturing apparatus for a glass article, comprising: a transfer pipe configured to allow a molten glass to flow inside thereof; and a refractory configured to retain the transfer pipe, wherein the transfer pipe comprises: a main body portion having a tubular shape; and a flange portion formed at an end portion of the main body portion, wherein the main body portion is retained by a refractory, and wherein the manufacturing apparatus further comprises an external force applying unit configured to apply an external force to the transfer pipe to extend the transfer pipe.

According to the configuration described above, through application of the external force to the transfer pipe with the external force applying unit provided to the manufacturing apparatus, the expansion length of the transfer pipe can be optimized when the transfer pipe is pre-heated. With this, the transfer pipe can be sufficiently expanded in advance. Thus, in the manufacture of a glass article, the deformation or buckling caused by further expansion of the transfer pipe is prevented, thereby being capable of achieving a long lifetime of the transfer pipe.

Advantageous Effects of Invention

According to the present invention, the transfer pipe can be sufficiently expanded in the pre-heating step.

DESCRIPTION OF EMBODIMENTS

Embodiments of the present invention are described below with reference to the drawings. A manufacturing method and manufacturing apparatus for a glass article according to an embodiment (first embodiment) of the present invention are illustrated in FIG. 1 to FIG. 8.

Figure 1:
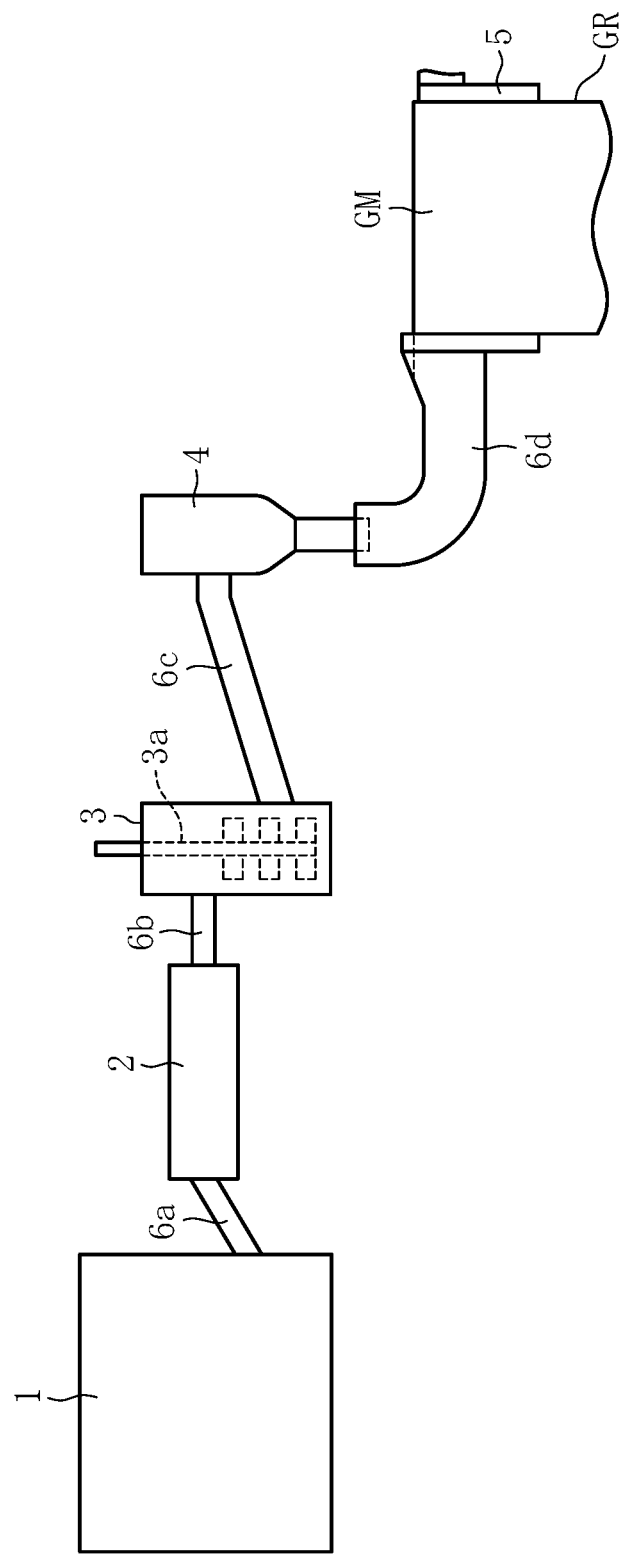
FIG. 1 is a side view for illustrating an overall configuration of a manufacturing apparatus for a glass article.

As illustrated in FIG. 1, a manufacturing apparatus for a glass article according to this embodiment comprises: a melting bath 1; a fining bath 2; a homogenization bath (stirring bath) 3; a pot 4; a forming body 5; and glass supply passages 6a to 6d configured to connect these constituents 1 to 5 in the stated order from an upstream side. In addition thereto, the manufacturing apparatus further comprises: an annealing furnace (not shown) configured to anneal a sheet glass GR (glass article) formed by the forming body 5; and a cutting device (not shown) configured to cut the sheet glass GR after the annealing.

The melting bath 1 is a container for performing a melting step of melting loaded glass raw materials to obtain a molten glass GM. The melting bath 1 is connected to the fining bath 2 through the glass supply passage 6a.

The fining bath 2 is a container for performing a fining step of, while transferring the molten glass GM, degassing the molten glass GM through the action of a fining agent or the like. The fining bath 2 is connected to the homogenization bath 3 through the glass supply passage 6b. The fining bath 2 of this embodiment is formed of the transfer pipe made of a platinum material (platinum or a platinum alloy).

The homogenization bath 3 is a container made of a platinum material for performing a step (homogenization step) of stirring the molten glass GM having been fined to homogenize the molten glass GM. The homogenization bath 3 comprises a stirrer 3a having a stirring blade. The homogenization bath 3 is connected to the pot 4 through the glass supply passage 6c.

The pot 4 is a container for performing a state adjustment step of adjusting the state of the molten glass GM so as to be suitable for forming. The pot 4 is presented as an example of a volume part configured to adjust the viscosity and flow rate of the molten glass GM. The pot 4 is connected to the forming body 5 through the glass supply passage 6d.

The forming body 5 is configured to form the molten glass GM into a preferred shape (for example, a sheet shape). In this embodiment, the forming body 5 is configured to form the molten glass GM into a sheet shape by an overflow down-draw method. Specifically, the forming body 5 has a substantially wedge shape in a sectional shape (sectional shape perpendicular to the drawing sheet of FIG. 1), and has an overflow groove (not shown) formed on an upper portion thereof.

The forming body 5 is configured to cause the molten glass GM to overflow from the overflow groove to flow down along both side wall surfaces (side surfaces located on a front surface side and a back surface side of the drawing sheet) of the forming body 5. The forming body 5 is configured to cause the molten glasses GM having flowed down to join each other at lower end portions of the side wall surfaces. With this, the band-shaped sheet glass GR is formed. Further, the forming body 5 may be used for performing any other down-draw method such as a slot down-draw method.

The band-shaped sheet glass GR obtained in such a manner is cut so that sheet glasses having a sheet shape are cut out. The sheet glass obtained as described above has a thickness of, for example, from 0.01 mm to 2 mm, and is utilized for a flat panel display, such as a liquid crystal display or an OLED display, a substrate of an OLED illumination or a solar cell, or a protective cover. A glass article according to the present invention is not limited to the sheet glass, and encompasses a glass pipe and other glass articles having various shapes. For example, when a glass pipe is to be formed, a forming device utilizing a Danner method is arranged in place of the forming body 5.

As a material of the sheet glass, silicate glass or silica glass is used, borosilicate glass, soda lime glass, aluminosilicate glass, or chemically strengthened glass is preferably used, and alkali-free glass is most preferably used. The "alkali-free glass" as used herein refers to glass substantially free of an alkaline component (alkali metal oxide), and specifically refers to glass having a weight ratio of an alkaline component of 3,000 ppm or less. In the present invention, the weight ratio of the alkaline component is preferably 1,000 ppm or less, more preferably 500 ppm or less, most preferably 300 ppm or less.

Figure 2:
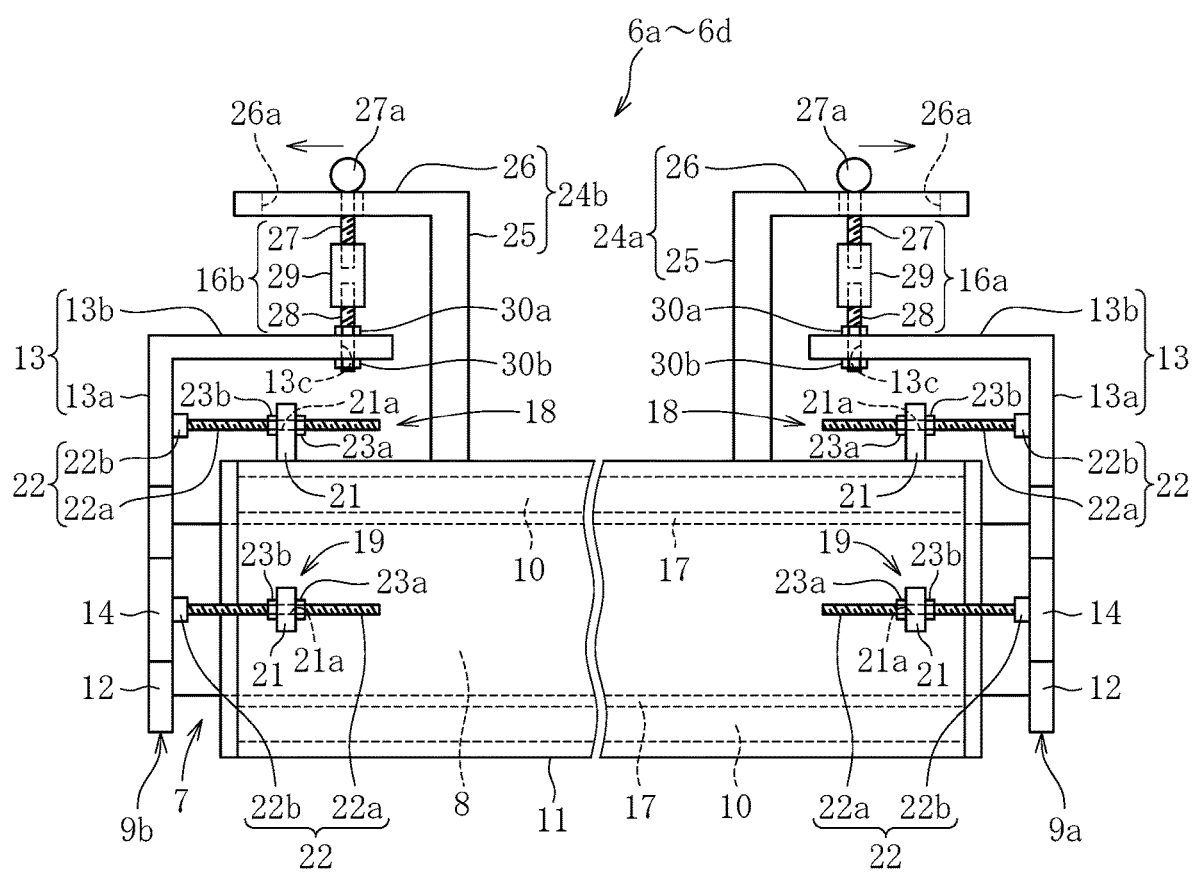
FIG. 2 is a side view of a transfer pipe.

The glass supply passages 6a to 6d are each formed of a transfer pipe 7. As illustrated in FIG. 2, the transfer pipe 7 comprises a main body portion 8 and flange portions 9a and 9b. The main body portion 8 has an elongated shape and is configured to transfer the molten glass GM. The flange portions 9a and 9b are provided at end portions of the main body portion 8, respectively. The main body portion 8 is retained by a refractory 10, and the refractory 10 is fixed to a casing 11.

The main body portion 8 is made of a platinum material (platinum or a platinum alloy) and has a tubular shape (for example, cylindrical shape). The main body portion 8 is formed so as to be longer than the refractory 10. Therefore, the end portions of the main body portion 8 project in a longitudinal direction from end portions of the refractory 10.

The flange portions 9a and 9b each have a plate shape. The flange portions 9a and 9b comprise a first flange portion 9a provided at one end portion of the main body portion 8 and a second flange portion 9b provided at another end portion of the main body portion 8. The flange portions 9a and 9b are formed so as to surround outer peripheral surfaces at the end portions of the main body portion 8, respectively.

Figure 3:
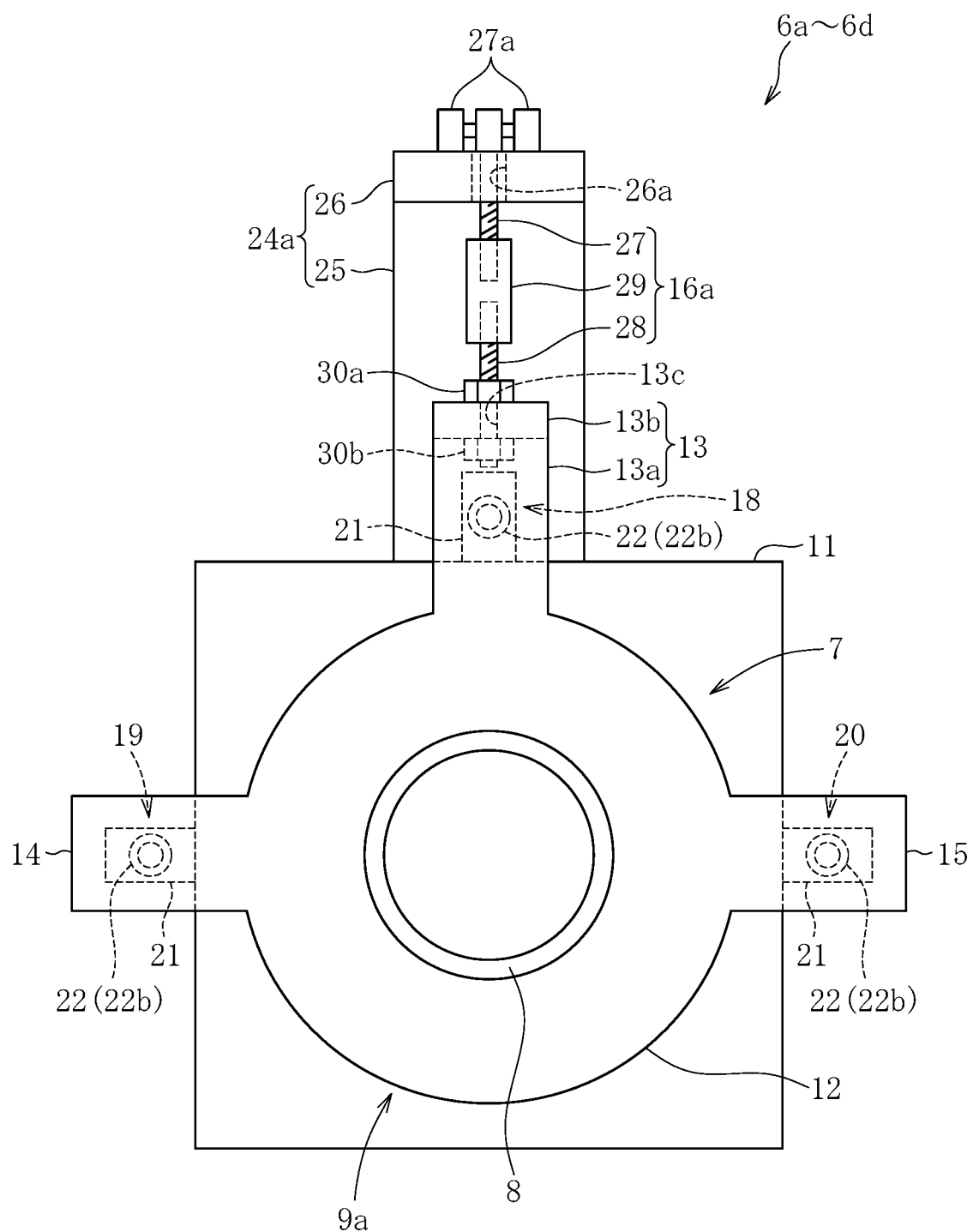
FIG. 3 is a front view of the transfer pipe.

As illustrated in FIG. 2 and FIG. 3, the flange portions 9a and 9b each comprise a disc portion 12 and a plurality of projecting portions 13 to 15 projecting from the disc portion 12. The disc portions 12 are fixed at the end portions of the main body portion 8 in the longitudinal direction and are each made of the platinum material. The projecting portions 13 to 15 comprise a first projecting portion 13, a second projecting portion 14, and a third projecting portion 15. The first projecting portion 13 projects upward from an upper portion of the disc portion 12. The second projecting portion 14 and the third projecting portion 15 project sideward from side portions of the disc portion 12.

The first projecting portions 13 serve as electrode portions (terminals) configured to cause a current to flow through the main body portion 8. The flange portions 9a and 9b apply a predetermined voltage to the first projecting portions 13 to directly energize and heat the main body portion 8. Therefore, the first projecting portions 13 are made of, for example, copper (including a copper alloy) or nickel (including a nickel alloy).

In order to support the flange portions 9a and 9b on the casing 11 through intermediation of coupling members 16a and 16b, the first projecting portions 13 comprise first portions 13a, which are formed integrally with the flange portions 9a and 9b, and second portions 13b, which are formed integrally with end portions of the first portions 13a. The first portions 13a are rectangular plate portions projecting upward from upper portions of the flange portions 9a and 9b. The second portions 13b are rectangular plate portions being continuous with the first portions 13a at the right angle. The second portions 13b project from upper end portions of the first portions 13a in a substantially horizontal direction or along the longitudinal direction of the main body portion 8. The second portions 13b each have a hole 13c passing through the corresponding one of the second portions 13b in an up-and-down direction.

The second projecting portion 14 and the third projecting portion 15 each have an elongated plate shape. The second projecting portion 14 projects radially outward from one side portion of the disc portion 12 (midway portion in the up-and-down direction). The third projecting portion 15 projects in a direction opposite to the second projection portion 14 from another side portion of the disc portion 12 (midway portion in the up-and-down direction). The second projecting portion 14 and the third projecting portion 15 may each be made of, for example, steel, and may also be made of copper or nickel similarly to the first projecting portion 13.

The refractory 10 (for example, a refractory brick) is made of a highly zirconia-based refractory, but the material is not limited thereto. The casing 11 is formed as a rectangular parallelepiped body or a cylindrical body made of steel or other metal, but the shape thereof is not limited thereto. The casing 11 is supported so that a position thereof is changeable by a carrier or the like (not shown) in a building such as a factory in which the manufacturing apparatus for a glass article is arranged.

A supporting material 17 configured to support the transfer pipe 7 is interposed between the refractory 10 and the main body portion 8. The supporting material 17 of this embodiment is a bonded body which is obtained by filling powder serving as a raw material between the main body portion 8 of the transfer pipe 7 and the refractory 10, and then diffusion-bonding the powder through heating. The "diffusion-bonding" refers to a method involving bringing the powder particles into contact with each other to bond the powder particles to each other through utilization of diffusion of atoms occurring between contact surfaces.

For example, a mixture of alumina powder and silica powder may be used as the powder to be the raw material of the supporting material 17. In this case, the mixture desirably contains alumina powder having a high melting point as a main component. The configuration of the supporting material 17 is not limited to the configuration described above, in addition to alumina powder and silica powder, other various material powders such as zirconia powder and yttria powder may be used independently. Alternatively, the supporting material 17 may be configured by mixing a plurality of kinds of powders. The supporting material 17 may be formed of a refractory fiber layer, which is held in contact with an outer peripheral surface of the main body portion 8 of the transfer pipe 7, and an unformed refractory layer, which is arranged on an outer side of the refractory fiber layer.

As illustrated in FIG. 2 and FIG. 3, the casing 11 comprises devices (pressing devices) 18 to 20 configured to press the flange portions 9a and 9B of the transfer pipe 7 and members (supporting members) 24a and 24b configured to support the transfer pipe 7.

The pressing devices 18 to 20 are configured to apply an external force F to the transfer pipe 7 along the longitudinal direction of the transfer pipe 7. The pressing devices 18 to 20 are provided at a plurality of positions on the casing 11. That is, the pressing devices 18 to 20 are arranged on an outer surface of the casing 11 at positions corresponding to those of the projecting portions 13 to 15 of the flange portions 9a and 9b. The plurality of pressing devices 18 to 20 comprise first pressing devices 18, second pressing devices 19, and third pressing devices 20. The first pressing devices 18 are provided at upper portions of the casing 11. The second pressing devices 19 and the third pressing device 20 are provided at side portions of the casing 11.

The pressing devices 18 to 20 each comprise a bracket 21 and a pressing member 22. The bracket 21 is provided on an outer surface of the casing 11. The pressing member 22 is supported by the bracket 21. The bracket 21 has a plate shape and comprises a hole 21a passing therethrough along a longitudinal direction of the casing 11 (longitudinal direction of the main body portion 8).

The pressing member 22 comprises a shaft portion 22a, a pressing portion 22b, and fixing members 23a and 23b. The pressing portion 22b is fixed at a distal end of the shaft portion 22a. The fixing members 23a and 23b are configured to fix the shaft portion 22a to the bracket 21. The shaft portion 22a has a male thread portion, and the male thread portion is inserted through the hole 21a of the bracket 21. The pressing portion 22b is made of an insulating material and has a disc shape, but the shape of the pressing portion 22b is not limited to the disc shape. The pressing portion 22b is formed so as to approach and separate with respect to the projecting portions 13 to 15 of the flange portions 9a and 9b by a rotary action of the shaft portion 22a. The fixing members 23a and 23b are formed of a pair of nuts. The fixing members 23a and 23b are each threadedly engaged with the male thread portion of the shaft portion 22a. The fixing members 23a and 23b are fastened so as to sandwich the bracket 21 to fix the shaft portion 22a.

In order to support the flange portions 9a and 9b through intermediation of the coupling members 16a and 16b, the casing 11 comprises the first supporting member 24a corresponding to the first flange portion 9a and the second supporting member 24b corresponding to the second flange portion 9b. The supporting members 24a and 24b each comprise a support column 25 and a supporting portion 26. The support column 25 projects upward from an upper outer surface of the casing 11. The supporting portion 26 receives one end portion of a corresponding one of the coupling members 16a and 16b coupled thereto.

The support column 25 is made of steel or other metal and has an elongated shape. The support column 25 has one end portion (lower end portion) fixed to the outer surface of the casing 11 by a method such as welding.

The supporting portion 26 projects in a horizontal direction or the longitudinal direction (cylinder axis direction) of the casing 11 from an upper end portion of the support column 25. The supporting portion 26 has a hole (hereinafter referred to as "elongated hole") 26a which is formed so as to be elongated in a projecting direction thereof. The elongated hole 26a passes through the supporting portion 26 in the up-and-down direction. A part of a corresponding one of the coupling members 16a and 16b is inserted through the elongated hole 26a.

The first coupling member 16a is configured to couple the first flange portion 9a and the first supporting member 24a to each other, and the second coupling member 16b is configured to couple the second flange portion 9b and the second supporting member 24b to each other. The coupling members 16a and 16b each comprise a first rod 27, a second rod 28, and an insulating member 29. The first rod 27 is coupled to the supporting portion 26. The second rod 28 is coupled to a corresponding one of the flange portions 9a and 9b. The insulating member 29 is provided at a midway portion of a corresponding one of the coupling members 16a and 16b. The first rod 27 is supported by the supporting portion 26. The second rod 28 is fixed to the first projecting portion 13 of a corresponding one of the flange portions 9a and 9b by fixing members 30a and 30b.

The first rod 27 is formed of a screw member made of metal. One end portion (upper end portion) of the first rod 27 is retained in a movable state by the supporting portion 26 of a corresponding one of the supporting members 24a and 24b. Another end portion of the first rod 27 is fastened to a female thread portion of the insulating member 29.

A roller 27a configured to travel on an upper surface of the supporting portion 26 is rotatably provided at an upper end portion of the first rod 27. The roller 27a is held in contact with the upper surface of the supporting portion 26 so that, when the main body portion 8 of the transfer pipes 7 is expanded by heating, the roller 27a follows the movement of the first rod 27 caused by the expansion.

The second rod 28 is formed of a screw member made of metal, similarly to the first rod 27. One end portion (upper end portion) of the second rod 28 is fastened to a female thread portion of the insulating member 29 without being brought into contact with another end portion (lower end portion) of the first rod 27. Another end portion (lower end portion) of the second rod 28 is inserted through a hole 13c formed through the second portion 13b of the first projecting portion 13 of a corresponding one of the flange portions 9a and 9b, and is fixed to the second portion 13b by the fixing members 30a and 30b.

The fixing members 30a and 30b are formed of a pair of nuts. The fixing members 30a and 30b are threadedly engaged with the second rod 28. Under a state in which a part of the second rod 28 is inserted through the hole 13c formed in the second portion 13b of the first projecting portion 13, the fixing members 30a and 30b are fastened so as to sandwich the second portion 13b of the first projecting portion 13, thereby fixing the second rod 28 to the second portions 13b.

An insulator is suitably used as the insulating member 29. Besides the insulator, a member which is made of a synthetic rubber or any other various materials and has a rectangular parallelepiped shape or a circular column shape may be used. The insulating member 29 couples the first rod 27 and the second rod 28 to each other under a state in which the lower end portion of the first rod 27 and the upper end portion of the second rod 28 are separated apart from each other without contact therebetween. As described above, the insulating member 29 is interposed between a corresponding one of the supporting members 24a and 24b and the first projecting portion 13 under a state in which the corresponding one of the supporting member 24a and 24b and the first projecting portion 13 are connected to each other by the first rod 27 and the second rod 28.

Figure 4:
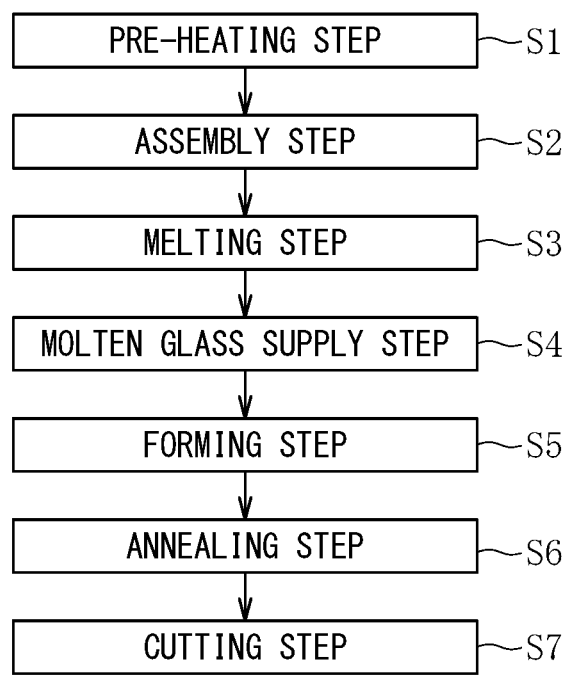
FIG. 4 is a flowchart of a manufacturing method for a glass article.
Figure 5:
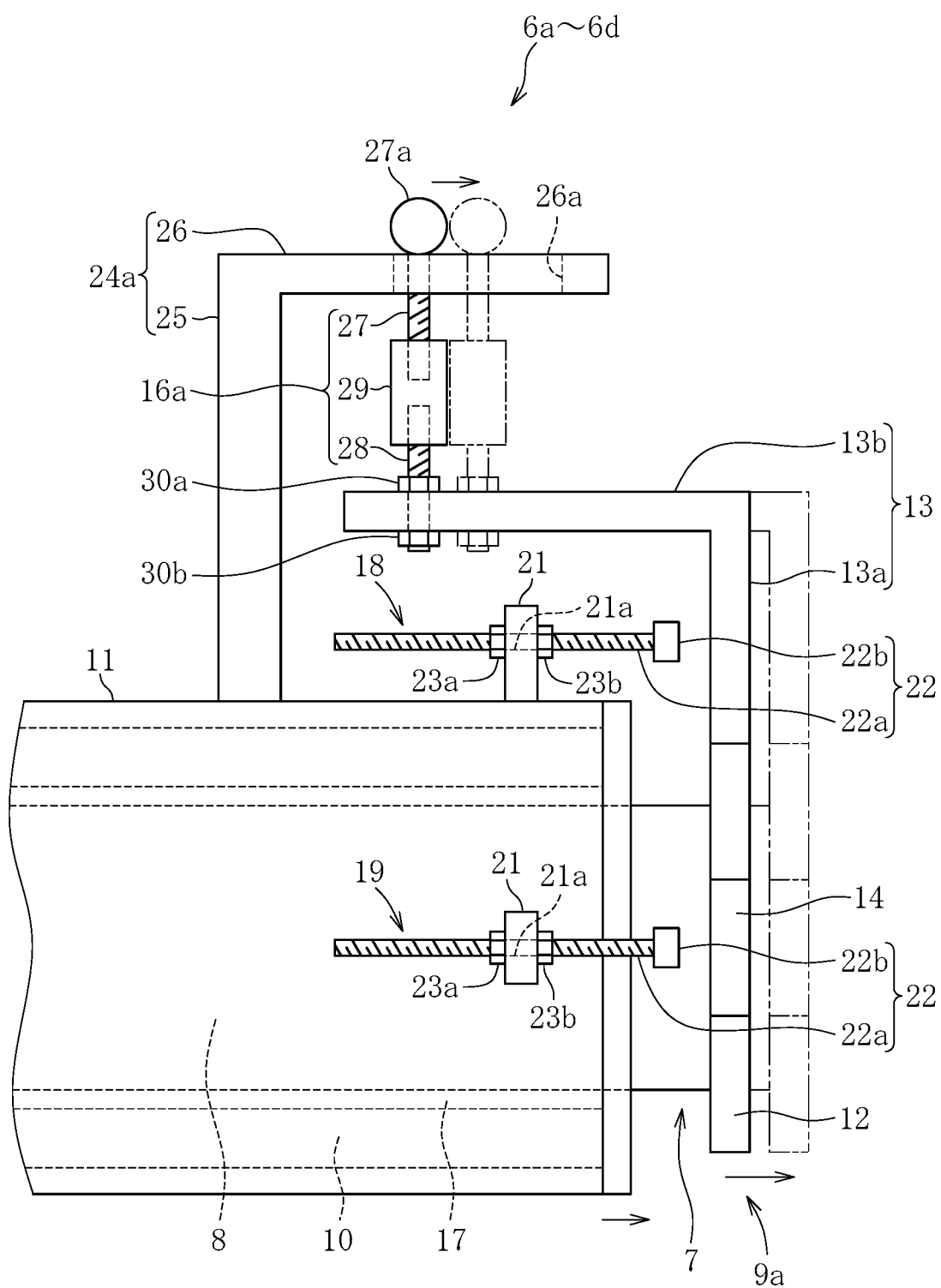
FIG. 5 is a side view for illustrating the transfer pipe in a pre-heating step.

Now, a method of manufacturing a glass article (sheet glass) through use of the manufacturing apparatus having the configuration described above is described. As illustrated in FIG. 4, this method mainly comprises a pre-heating step S1, an assembly step S2, a melting step S3, a molten glass supply step S4, a forming step S5, an annealing step S6, and a cutting step S7.

In the pre-heating step S1, the constituents 1 to 5 and 6a to 6d of the manufacturing apparatus are increased in temperature under the state in which the constituents 1 to 5 and 6a to 6d are individually separated. In the following, as an example of the pre-heating step S1, description is made of a case in which the transfer pipe 7 constituting each of the glass supply passages 6a to 6d are increased in temperature.

In the pre-heating step S1, in order that the main body portion 8 of the transfer pipe 7 may be increased in temperature, a current is caused to flow through the main body portion 8 via the flange portions 9a and 9b. Through this heating, as indicated by the two-dot chain lines in FIG. 5, the main body portion 8 of the transfer pipe 7 expands in the longitudinal direction (axis direction) thereof. Moreover, the main body portion 8 and the flange portions 9a and 9b expand in a radial direction.

At this time, the supporting material 17 filled between the refractory 10 and the main body portion 8 in the casing 11 maintains a powder state, and can flow (move) in a space defined between the main body portion 8 and the refractory 10. As described above, the powder serving as the supporting material 17 acts as a lubricating material to reduce a friction force generated between the main body portion 8 and the supporting material 17. That is, the main body portion 8 is retained by the refractory 10 under a state in which the main body portion 8 is extendable through the application of the external force.

Moreover, the flange portions 9a and 9b are displaced in the longitudinal direction of the main body portion 8 in response to the expansion of the main body portion 8. At this time, the coupling members 16a and 16b coupled to the flange portions 9a and 9b are capable of following the displacement of the flange portions 9a and 9b with the rollers 27a rolling on the upper surfaces of the supporting portions 26 of the supporting members 24a and 24b (see the solid lines and the two-dot chain lines in FIG. 5). Thus, the supporting structure with the support columns 25 and the coupling members 16a and 16b are capable of suitably supporting the flange portions 9a and 9b without hindering the expansion of the transfer pipe 7 (main body portion 8).

In the pre-heating step S1, an expansion length of the transfer pipe 7 is measured (measurement step). The expansion length of the transfer pipe 7 is measured by the following method. For example, laser radiation devices corresponding to the flange portions 9a and 9b are arranged at positions apart from the flange portions 9a and 9b, and laser beams are radiated from the laser radiation devices in a vertical direction to measure a change in distance between the laser beam and each of the flange portions 9a and 9b at every certain heating time. The amount of the change in distance can be considered as the expansion length of the transfer pipe 7 (main body portion 8).

As another measurement method, an expansion length of a part of the main body portion 8 covered with the casing 11 and an expansion length of a part exposed from the casing 11 may be individually measured, and a sum total of the expansion lengths may be regarded as the expansion length of the transfer pipe 7. In the pre-heating step S1, the casing 11 also similarly expands. Therefore, an expansion length of the casing 11 in the longitudinal direction of the main body portion 8 may be measured, and the measured expansion length can be considered as the expansion length of the part of the main body portion 8 covered with the casing 11.

Figure 6:
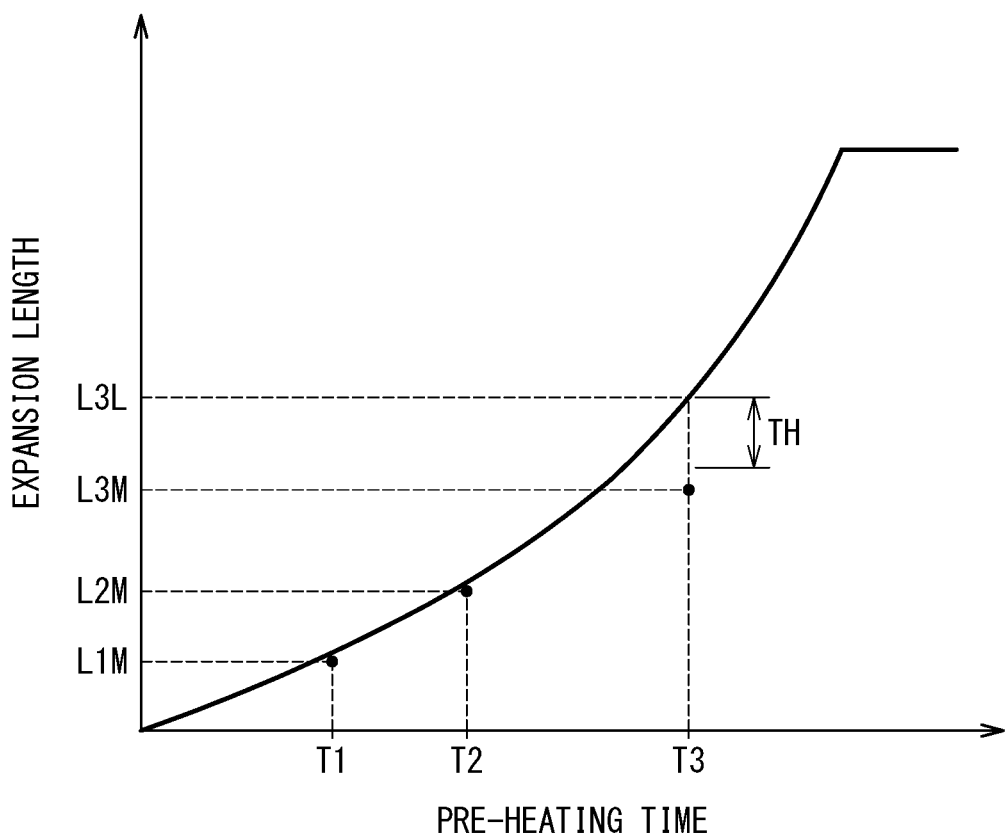
FIG. 6 is a graph for showing a relationship between a pre-heating time and an expansion length of the transfer pipe.
Figure 7:
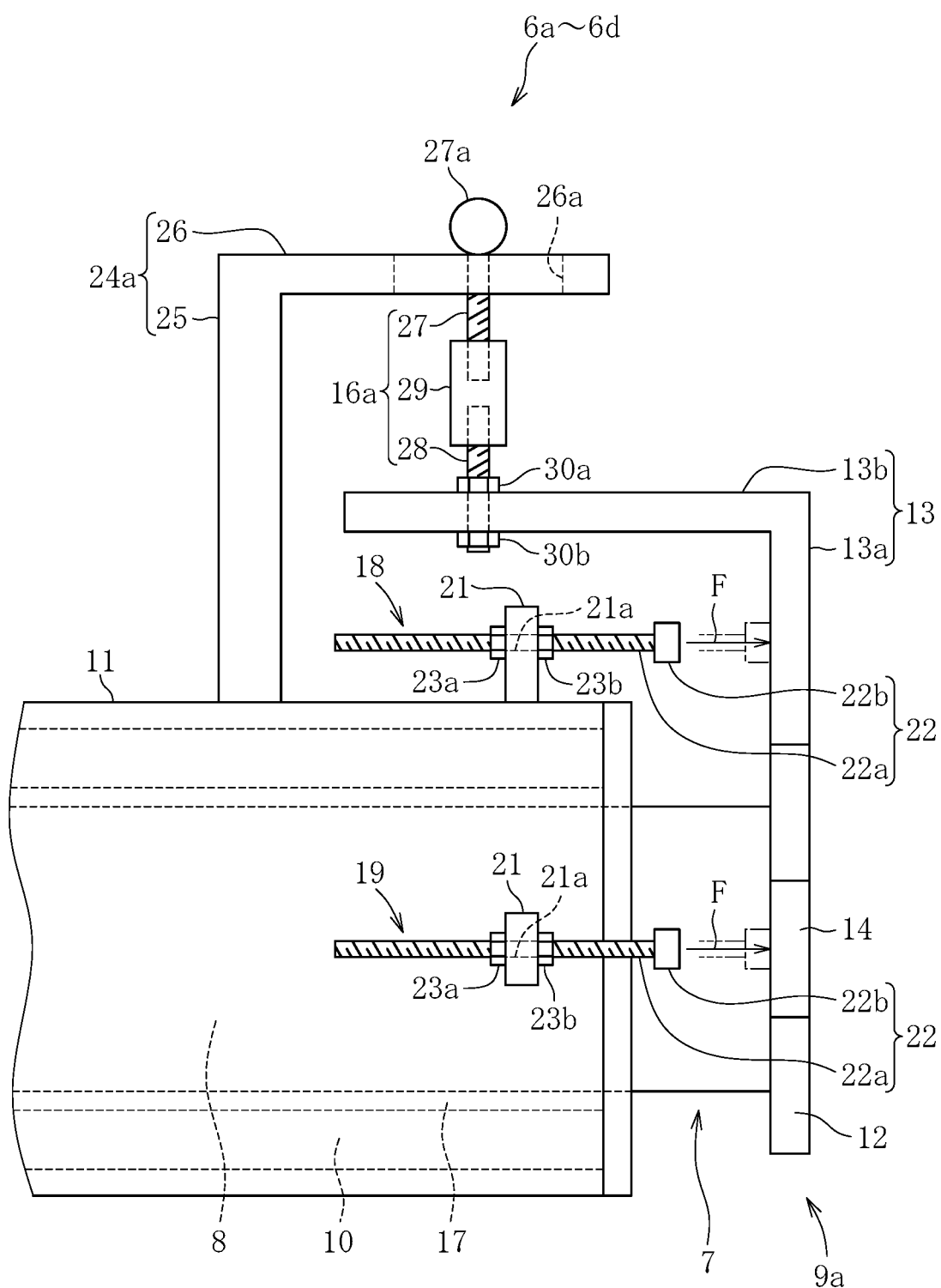
FIG. 7 is a side view for illustrating the transfer pipe in the pre-heating step.
Figure 8:
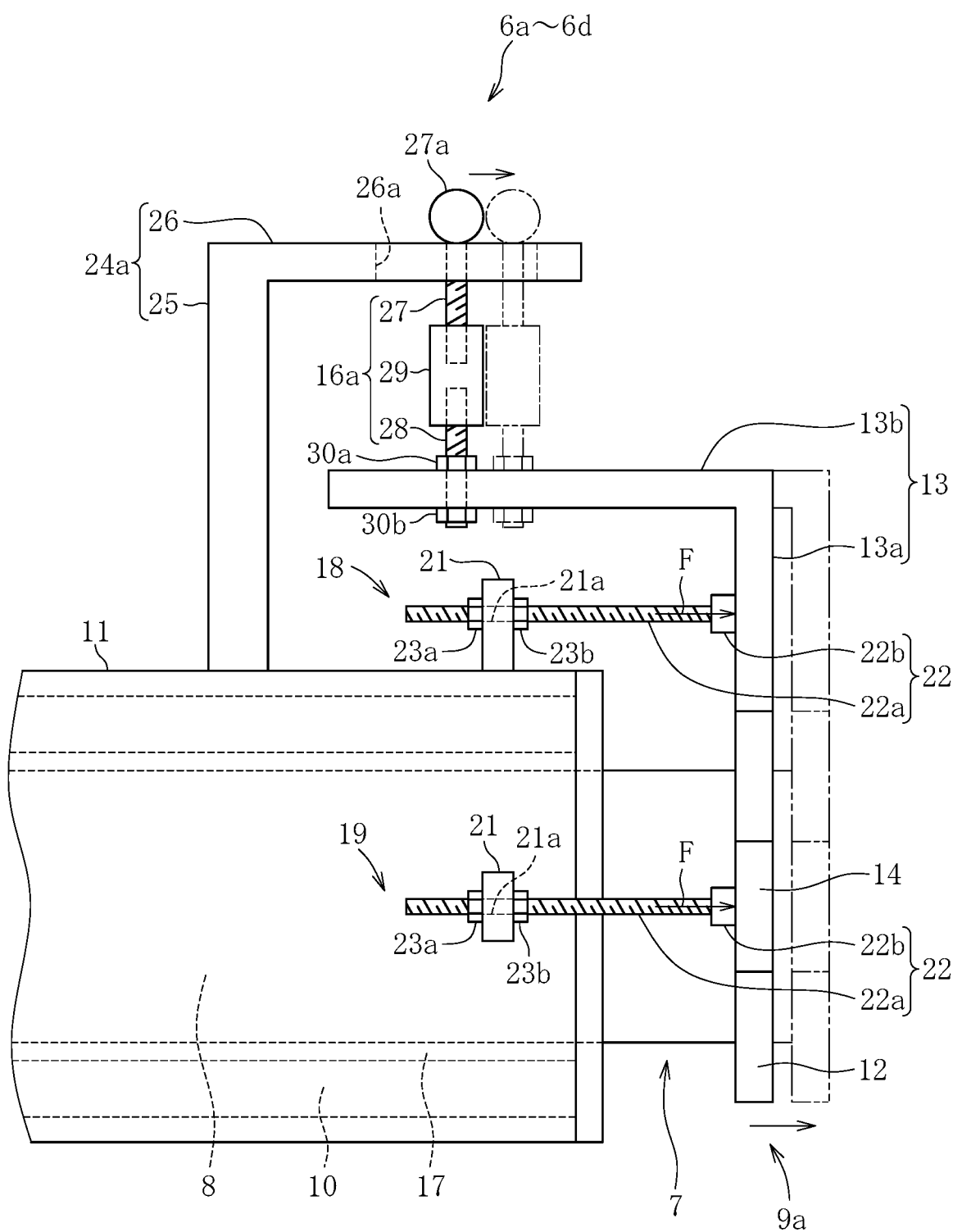
FIG. 8 is a side view for illustrating the transfer pipe in the pre-heating step.

FIG. 6 is a graph for showing a relationship between a time of pre-heating and the expansion length of the transfer pipe 7. In FIG. 6, a theoretical expansion curve is indicated by the solid line. In FIG. 6, symbol L1M represents an expansion length of the transfer pipe 7 measured at a pre-heating time T1. Similarly, symbols L2M and L3M represent expansion lengths of the transfer pipes 7 measured at pre-heating times T2 and T3, respectively. Moreover, symbol L3L represents an expansion length on the theoretical expansion curve at the pre-heating time T3.

In this embodiment, the theoretical expansion curve is determined in the manner described below. Specifically, a relationship between the pre-heating time and the heating temperature for the transfer pipe 7 is obtained. With use of the determined heating temperature and a coefficient of thermal expansion of the transfer pipe 7, the expansion length of the transfer pipe 7 is calculated.

In the pre-heating step S1, the expansion length of the transfer pipe 7 is periodically measured, and the measured expansion length (hereinafter referred to as "measured expansion length") is compared with the length on the theoretical expansion curve (hereinafter referred to as "theoretical expansion length"). As a result of this comparison, when a difference between the measured expansion length and the theoretical expansion length is larger than a predetermined threshold value, the flange portions 9a and 9b are pressed by the pressing devices 18 to 20 (external force application step).

That is, as shown in FIG. 6, when a difference (L3L−L3M) between the measured expansion length L3M at the pre-heating time T3 and the theoretical expansion length L3L at the time T3 is larger than a threshold value TH, it is determined that the measured expansion length of the main body portion 8 is insufficient, and the pressing devices 18 to 20 apply the external force F to the transfer pipe 7 so that the measured expansion length L3M approaches the theoretical expansion length L3L. For example, when the transfer pipe 7 has a length of 2,000 mm, the threshold value TH may be set to 1 mm.

In the external force application step, through rotation of the pressing members 22 of the pressing devices 18 to 20, the pressing portions 22b located at waiting positions apart from the flange portions 9a and 9b are caused to approach the projecting portions 13 to 15 of the flange portions 9a and 9b. With this, the pressing portions 22b are brought into contact with one surface of a corresponding one of the flange portions 9a and 9b (see FIG. 7). Then, the pressing members 22 are rotated so that the pressing portions 22b press the projecting portions 13 to 15. With this, the external force F is applied along the longitudinal direction of the main body portion 8 to the projecting portions 13 to 15 provided at a plurality of positions in the circumferential direction of each of the flange portions 9a and 9b. This external force F is applied to the flange portions 9a and 9b not for generating tensile stress exerted in the longitudinal direction in the main body portion 8 but for contributing to the expansion of the main body portion 8. As described above, through the application of the external force F to the projecting portions 13 to 15, the main body portion 8 is extended, and the thermal stress (compression stress in the longitudinal direction) along with the extension of the main body portion 8 is reduced. Moreover, the main body portion 8 can be expanded to a length corresponding to the pre-heating time (heating temperature) (see FIG. 8).

When the main body portion 8 reaches a predetermined temperature (for example, 1,200° C. to 1,400° C.), the pre-heating step S1 is terminated, and the assembly step S2 is performed. In the assembly step S2, the constituents 1 to 5 and 6a to 6d of the manufacturing apparatus, which have been heated and expanded, are coupled to one another so that the manufacturing apparatus is assembled.

In the melting step S3, the glass raw materials supplied to the melting bath 1 are heated to generate the molten glass GM. In order to shorten a start-up time of the manufacturing apparatus, the molten glass GM may be generated in the melting bath 1 in advance during or before the assembly step S2.

In the molten glass supply step S4, the molten glass GM in the melting bath 1 is sequentially transferred to the fining bath 2, the homogenization bath 3, the pot 4, and the forming body 5 through the glass supply passages 6a to 6d. In molten glass supply step S4, when the molten glass GM flows through the fining bath 2, gas (bubbles) is generated from the molten glass GM by an action of the fining agent blended in the glass raw material. This gas is discharged to the outside from the fining bath 2 (fining step). Moreover, in the homogenization bath 3, the molten glass GM is stirred and homogenized (homogenizing step). When the molten glass GM flows through the pot 4 and the glass supply passage 6d, a state of the molten glass GM (for example, viscosity and flow rate) is adjusted (state adjustment step).

In the molten glass supply step S4, when the temperature of powder interposed between the refractory 10 and the main body portion 8 becomes higher, the diffusion-bonding of the powder is activated. It is only required that the heating temperature for the powder be equal to or higher than a temperature that activates the diffusion-bonding of the powder, and it is preferred that the heating temperature be 1,400° C. or higher and 1,650° C. or lower.

In this embodiment, the diffusion-bonding occurs between the alumina powders in the powder and between the alumina powder and the silica powder in the powder. In addition, mullite is generated from the alumina powder and the silica powder. The mullite strongly bonds the alumina powders to each other. The diffusion-bonding proceeds with time, and finally, the powder becomes one or a plurality of bonded bodies (supporting material 17). The supporting material 17 adheres to the main body portion 8 and the refractory 10, which hinders the movement of the main body portion 8 relative to the refractory 10 in the molten glass supply step S4. With this, the main body portion 8 is fixed to the refractory 10 so as to prevent positional displacement. The supporting material 17 keeps supporting the main body portion 8 together with the refractory 10 until the manufacture of the sheet glass GR is terminated.

In the forming step S5, the molten glass GM is supplied to the forming body 5 after the molten glass supply step S4. The forming body 5 is configured to cause the molten glass GM to overflow from the overflow groove to flow down along the side wall surfaces of the forming body 5. The forming body 5 is configured to cause the molten glasses GM having flowed down to join each other at lower end portions of the side wall surfaces. Thus, the band-shaped sheet glass GR is formed.

After that, the band-shaped sheet glass GR is subjected to the annealing step S6 with the annealing furnace and the cutting step S7 with the cutting device to be cut into sheet glasses having predetermined dimensions. As a result of the steps described above, a sheet glass being a glass article is completed. Alternatively, a glass roll being a glass article may be obtained by removing both ends of the sheet glass GR in a width direction in the cutting step S7 and thereafter taking up the band-shaped sheet glass GR into a roll shape (take-up step).

With the manufacturing method for a glass article according to this embodiment described above, through the application of the external force F to the flange portions 9a and 9b of the transfer pipe 7, in the pre-heating step S1, expansion of the main body portion 8 is promoted so that the transfer pipe 7 can be sufficiently expanded, thereby being capable of reducing the thermal stress generated in the transfer pipe 7. Thus, the thermal stress generated in the transfer pipe 7 can be reduced also in the course of manufacture of a glass article (molten glass supply step S4), and deformation or buckling of the transfer pipe 7 caused by the expansion can be prevented, thereby being capable of achieving a long lifetime of the transfer pipe 7.

Figure 9:
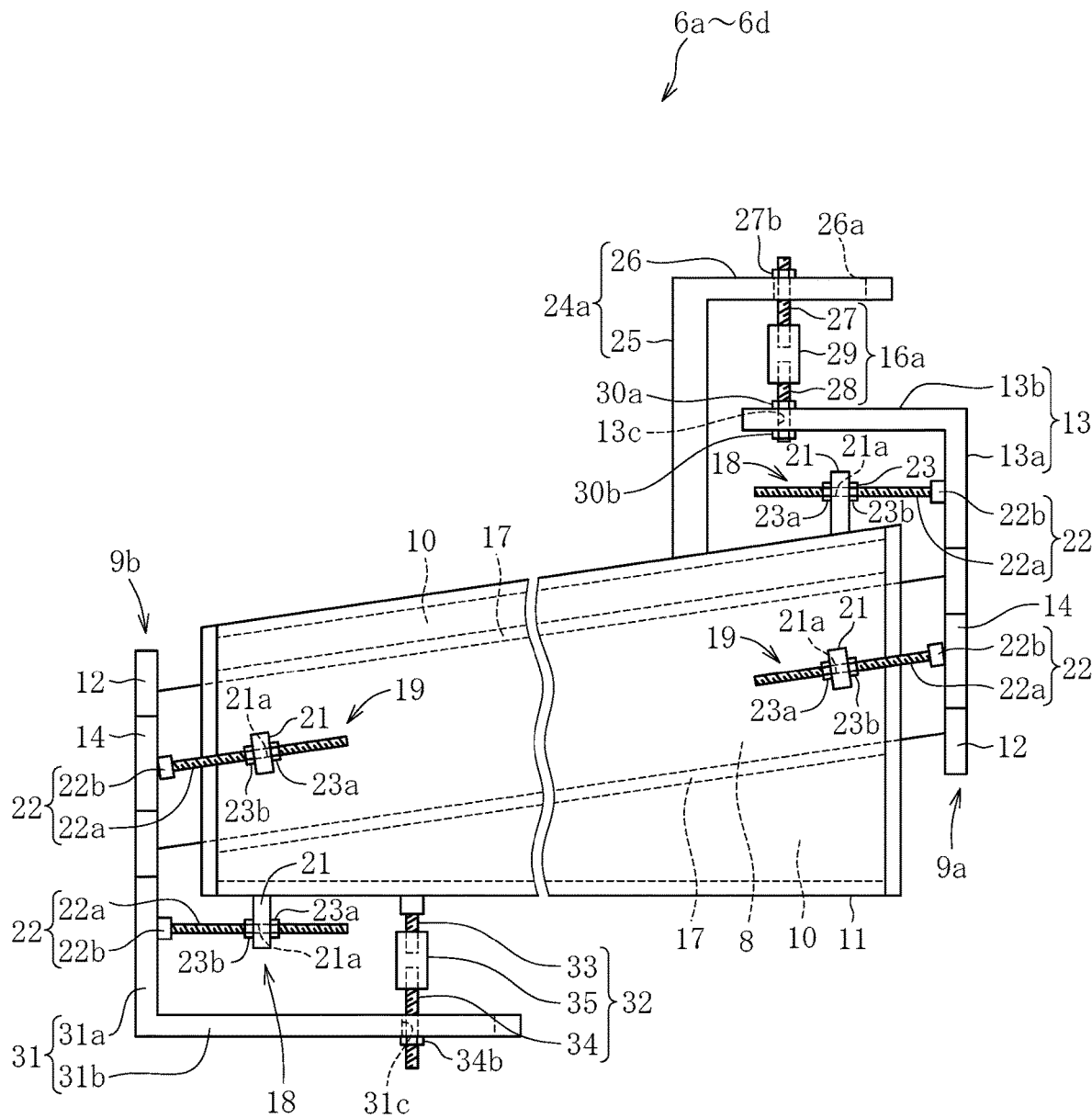
FIG. 9 is a side view for illustrating another example of the transfer pipe.

FIG. 9 is an illustration of another example of the transfer pipe (second embodiment). The transfer pipe 7 of this example is to be used for, for example, the glass supply passage 6a configured to connect the melting bath 1 and the fining bath 2 to each other. The main body portion 8 of the transfer pipe 7 is inclined so that the end portion on the first flange portion 9a side is located higher than the end portion on the second flange portion 9b side. It is preferred that an inclination angle of the main body portion 8 with respect to the horizontal direction be, for example, from 3° to 30°.

In the supporting structure for the first flange portion 9a in the second embodiment, a nut 27b is provided in place of the roller 27a at the upper end portion of the first rod 27. This nut 27b is slidable on the upper surface of the supporting portion 26.

In the supporting structure for the second flange portion 9b in the second embodiment, the first projecting portion 31 comprises a first portion 31a and a second portion 31b. The first portion 31a projects downward from a lower portion of the disc portion 12. The second portion 31b projects from the first portion 31a toward a center portion side of the main body portion 8 in the longitudinal direction. The second portion 31b extends horizontally. Moreover, the coupling member 32 comprises a first rod 33, a second rod 34, and an insulating member 35. The first rod 33 is fixed to a lower surface of the casing 11. The second rod 34 is coupled to the second portion 31b. The insulating member 35 is provided at a midway portion of the coupling member 32. A nut 34b held in contact with the lower surface of the second portion 31b is provided at a lower end portion of the second rod 34. This nut 34b is slidable on the lower surface of the second portion 31b. With the first projecting portion 31 and the coupling member 32 having such a configuration, the second flange portion 9b is supported on the casing 11 under a state in which the movement along the longitudinal direction of the transfer pipe 7 (main body portion 8) is allowed.

Along with the extension of the main body portion 8 in the pre-heating step S1, a distance from the supporting portion 26 to the second portion 13b of the first projecting portion 13 becomes shorter, and a distance from the lower surface of the casing 11 to the second portion 31b of the first projecting portion 31 becomes longer. Therefore, the length of the coupling member 16a, 32 is adjusted so as to follow the change in distance described above. The length of the coupling member 16a, 32 may be adjusted, for example, by changing a fastening length of the first rod 27, 33 and/or the second rod 28, 34 with respect to the insulating member 29, 35.

The supporting portion 26 of the second embodiment extends horizontally, but may be inclined so as to be parallel to the main body portion 8. Moreover, the second portion 31b of the first projecting portion 31 extends horizontally, but may be inclined so as to be parallel to the main body portion 8. When the supporting portion 26 and the second portion 31b are inclined, there is no need to adjust the length of the coupling member 16a, 32. Moreover, in place of the nut 27b, 34b, another slide member capable of sliding or a roller may be used.

The first pressing device 18 corresponding to the second flange portion 9b is provided on the lower surface of the casing 11. That is, the bracket 21 of the first pressing device 18 is fixed to the lower surface of the casing 11 and projects downward from the lower surface. The pressing member 22 is supported on the bracket 21 through intermediation of the shaft portion 22a so that the pressing member 22 can advance and retreat. The pressing member 22 brings the pressing portion 22b into contact with the first portion 31a of the first projecting portion 31 on the second flange portion 9b and presses the first portion 31a, to thereby apply the external force to the second flange portion 9b.

The shaft portion 22a of the pressing member 22 of the second pressing device 19 is inclined at the same angle as the main body portion 8 so that the pressing member 22 is set parallel to the main body portion 8. Although illustration is omitted, the pressing member 22 of the third pressing device 20 is also inclined at the same angle as the main body portion 8. The pressing members 22 of the second pressing device 19 and the third pressing device 20 are capable of pressing the second projecting portions 14 and the third projecting portions 15 of the flange portions 9a and 9b along the inclination direction of the main body portion 8. Also in this example, when the expansion of the main body portion 8 is insufficient in the pre-heating step S1, the external force for promoting the expansion can be applied to the flange portions 9a and 9b by the pressing devices 18 to 20.

The present invention is not limited to the configurations of the above-mentioned embodiments. In addition, the action and effect of the present invention are not limited to those described above. The present invention may be modified in various forms within the range not departing from the spirit of the present invention.

In the embodiments described above, the transfer pipe 7 forming each of the glass supply passages 6a to 6d is given as an example. However, the transfer pipe 7 is not limited to such use, and the fining bath 2 may be formed of the transfer pipe 7 of the mode described above. That is, the present invention is applicable also to the fining bath 2.

The direction of applying the external force is not limited to the direction along the longitudinal direction of the transfer pipe 7 (inclination direction), and may be a direction forming an angle with respect to the longitudinal direction (inclination direction) of the transfer pipe 7 as long as the transfer pipe 7 can be extended. For example, when the flange portions 9a and 9b which are parallel to a vertical plane are provided to the transfer pipe 7 which is inclined as in FIG. 9, the external force may be applied along the direction perpendicular to the flange portions 9a and 9b of the transfer pipe 7 as in the first pressing device 18. In the viewpoint of efficiently extending the transfer pipe 7, it is preferred that the angle formed between the direction of applying the external force and the longitudinal direction (inclination direction) of the transfer pipe 7 be 30° or less, more preferably 15° or less, most preferably 0°.

REFERENCE SIGNS LIST 7 transfer pipe
8 main body portion
9a first flange portion
9b second flange portion
10 refractory
11 casing
18 first pressing device (external force application unit)
19 second pressing device (external force application unit)
20 third pressing device (external force application unit)
22 pressing member
F external force
S1 pre-heating step
S4 molten glass supply step (transfer step)
L3L theoretical expansion length
L3M measured expansion length
TH threshold value

The invention claimed is:

1. A manufacturing method for a glass article, comprising:
a pre-heating step of heating a transfer pipe; and
a transfer step of allowing a molten glass to flow inside the transfer pipe after the pre-heating step,
wherein the transfer pipe comprises:
a main body portion having a tubular shape; and
a flange portion formed at an end portion of the main body portion,
wherein the main body portion is retained by a refractory, and
wherein the pre-heating step comprises an external force application step of applying an external force to the transfer pipe to extend the transfer pipe.

2. The manufacturing method for a glass article according to claim 1, wherein, in the external force application step, the external force is applied to the transfer pipe so that a measured expansion length of the transfer pipe approaches a theoretical expansion length.

3. The manufacturing method for a glass article according to claim 2, wherein the external force application step is performed when a difference between the theoretical expansion length and the measured expansion length is larger than a predetermined threshold value.

4. The manufacturing method for a glass article according to claim 3,
wherein the refractory is fixed to a casing, and
wherein, in the external force application step, the external force is applied to the transfer pipe by bringing a pressing member of the casing into contact with the flange portion.

5. The manufacturing method for a glass article according to claim 4, wherein, in the external force application step, the external force is applied to the flange portion at a plurality of positions in a circumferential direction of the flange portion.

6. The manufacturing method for a glass article according to claim 4,
wherein the main body portion of the transfer pipe is arranged in an inclined posture, and
wherein, in the external force application step, the external force is applied along an inclination direction of the main body portion.

7. The manufacturing method for a glass article according to claim 3, wherein, in the external force application step, the external force is applied to the flange portion at a plurality of positions in a circumferential direction of the flange portion.

8. The manufacturing method for a glass article according to claim 3,
wherein the main body portion of the transfer pipe is arranged in an inclined posture, and
wherein, in the external force application step, the external force is applied along an inclination direction of the main body portion.

9. The manufacturing method for a glass article according to claim 2,
wherein the refractory is fixed to a casing, and
wherein, in the external force application step, the external force is applied to the transfer pipe by bringing a pressing member of the casing into contact with the flange portion.

10. The manufacturing method for a glass article according to claim 9, wherein, in the external force application step, the external force is applied to the flange portion at a plurality of positions in a circumferential direction of the flange portion.

11. The manufacturing method for a glass article according to claim 9,
wherein the main body portion of the transfer pipe is arranged in an inclined posture, and
wherein, in the external force application step, the external force is applied along an inclination direction of the main body portion.

12. The manufacturing method for a glass article according to claim 2, wherein, in the external force application step, the external force is applied to the flange portion at a plurality of positions in a circumferential direction of the flange portion.

13. The manufacturing method for a glass article according to claim 2,
    wherein the main body portion of the transfer pipe is arranged in an inclined posture, and
    wherein, in the external force application step, the external force is applied along an inclination direction of the main body portion.

14. The manufacturing method for a glass article according to claim 1,
    wherein the refractory is fixed to a casing, and
    wherein, in the external force application step, the external force is applied to the transfer pipe by bringing a pressing member of the casing into contact with the flange portion.

15. The manufacturing method for a glass article according to claim 14, wherein, in the external force application step, the external force is applied to the flange portion at a plurality of positions in a circumferential direction of the flange portion.

16. The manufacturing method for a glass article according to claim 14,
    wherein the main body portion of the transfer pipe is arranged in an inclined posture, and
    wherein, in the external force application step, the external force is applied along an inclination direction of the main body portion.

17. The manufacturing method for a glass article according to claim 1, wherein, in the external force application step, the external force is applied to the flange portion at a plurality of positions in a circumferential direction of the flange portion.

18. The manufacturing method for a glass article according to claim 17,
    wherein the main body portion of the transfer pipe is arranged in an inclined posture, and
    wherein, in the external force application step, the external force is applied along an inclination direction of the main body portion.

19. The manufacturing method for a glass article according to claim 1,
    wherein the main body portion of the transfer pipe is arranged in an inclined posture, and
    wherein, in the external force application step, the external force is applied along an inclination direction of the main body portion.

20. A manufacturing apparatus for a glass article, comprising:
    a transfer pipe configured to allow a molten glass to flow inside thereof; and
    a refractory configured to retain the transfer pipe,
    wherein the transfer pipe comprises:
        a main body portion having a tubular shape; and
        a flange portion formed at an end portion of the main body portion,
    wherein the main body portion is retained by the refractory, and
    wherein the manufacturing apparatus further comprises an external force applying unit configured to apply an external force to the transfer pipe to extend the transfer pipe.

* * * * *